United States Patent
Ying et al.

(10) Patent No.: US 10,493,964 B2
(45) Date of Patent: Dec. 3, 2019

(54) SYSTEM AND METHOD FOR WHEEL OSCILLATION MITIGATION USING BRAKE FORCE RIPPLE INJECTION

(71) Applicant: Autoliv ASP, Inc., Ogden, UT (US)

(72) Inventors: Long Ying, Novi, MI (US); Juchirl Park, Southfield, MI (US); Alexandru Versin, Southfield, MI (US); Huan Fu, Southfield, MI (US)

(73) Assignee: VEONEER NISSIN BRAKE SYSTEMS JAPAN CO., LTD., Ueda-Shi, Nagano-Ken (JP)

( * ) Notice: Subject to any disclaimer, the term of this patent is extended or adjusted under 35 U.S.C. 154(b) by 203 days.

(21) Appl. No.: 15/639,513

(22) Filed: Jun. 30, 2017

(65) Prior Publication Data

US 2019/0001943 A1    Jan. 3, 2019

(51) Int. Cl.
| | |
|---|---|
| *B60T 8/1761* | (2006.01) |
| *B60T 8/1755* | (2006.01) |
| *B60T 7/12* | (2006.01) |
| *B60T 8/172* | (2006.01) |
| *B60T 8/173* | (2006.01) |

(Continued)

(52) U.S. Cl.
CPC ............ *B60T 8/1761* (2013.01); *B60T 7/12* (2013.01); *B60T 8/172* (2013.01); *B60T 8/173* (2013.01); *B60T 8/17555* (2013.01); *B60T 8/885* (2013.01); *B60T 8/175* (2013.01); *B60T 2240/06* (2013.01); *B60T 2270/406* (2013.01); *B60W 30/18172* (2013.01); *G01M 1/00* (2013.01);

(Continued)

(58) Field of Classification Search
CPC .......... B60T 8/1761; B60T 7/12; B60T 8/172; B60T 8/173; B60T 8/17555; B60T 8/885; B60T 8/175; B60T 8/17633; B60T 8/17616; B60T 8/4266; B60T 8/72; B60T 8/96; B60W 30/18172; B60W 40/06; B60W 50/02; B60W 10/02; B60W 10/06; B60W 10/18; B60W 10/22; B60W 30/20; B60W 10/04; B60W 30/1819; G01M 1/225; G01M 17/04; G01M 17/02; G01M 17/022; G07C 5/006; G07C 5/0808; G07C 5/085; B60C 23/0416; B60C 23/065; B65B 67/12; F02D 41/0087; F02D 41/1498; B60G 17/0195; B60G 17/019; G05B 19/042; G01L 17/00; F02P 5/1504; F02P 9/005; F16D 48/06; F16F 15/00

See application file for complete search history.

(56) References Cited

U.S. PATENT DOCUMENTS

| | | |
|---|---|---|
| 3,235,036 A | 2/1966 | Meyer et al. |
| 3,717,384 A | 2/1973 | Harned |

(Continued)

OTHER PUBLICATIONS

International Search Report in related application PCT/US2018/039296 A1, ISA/US, dated Sep. 19, 2018.

*Primary Examiner* — Behrang Badii
(74) *Attorney, Agent, or Firm* — Stephen T. Olson; Harness, Dickey & Pierce, P.L.C.

(57) ABSTRACT

A method is disclosed for mitigating wheel hop of a motor vehicle. The method may involve detecting an oscillation of a wheel speed of a driven wheel of the motor vehicle of the motor vehicle. When oscillation of the wheel is detected, a low amplitude, high frequency ripple braking signal is applied to a brake caliper associated with the wheel to modulate a braking action acting on the wheel.

11 Claims, 2 Drawing Sheets

(51) Int. Cl.
*B60T 8/88* (2006.01)
*B60T 8/175* (2006.01)
*G01M 1/22* (2006.01)
*G01M 1/00* (2006.01)
*G01M 17/02* (2006.01)
*B60W 30/18* (2012.01)

(52) U.S. Cl.
CPC .............. *G01M 1/22* (2013.01); *G01M 1/225* (2013.01); *G01M 17/022* (2013.01)

(56) References Cited

U.S. PATENT DOCUMENTS

| | | |
|---|---|---|
| 3,727,992 A | 4/1973 | Bowler et al. |
| 5,992,951 A * | 11/1999 | Naito ...................... B60T 8/172 303/171 |
| 6,314,342 B1 | 11/2001 | Kramer et al. |
| 7,451,034 B2 | 11/2008 | Deur et al. |
| 8,140,238 B2 | 3/2012 | Luehrsen et al. |
| 2001/0007208 A1* | 7/2001 | Colarelli, III ......... G01M 1/225 73/462 |
| 2012/0303236 A1* | 11/2012 | Andonian ............... B60T 8/175 701/83 |
| 2018/0082492 A1* | 3/2018 | Stanek ................... G07C 5/006 |

* cited by examiner

SYSTEM AND METHOD FOR WHEEL OSCILLATION MITIGATION USING BRAKE FORCE RIPPLE INJECTION

FIELD

The present disclosure relates to systems for suppressing wheel hop in a vehicle, and more particularly to systems and methods for suppressing wheel hop through selective control of the vehicle's brake system.

BACKGROUND

The statements in this section merely provide background information related to the present disclosure and may not constitute prior art.

Most modern vehicles have one or more of a traction control system (TCS), an antilock brake system (ABS), or some other form of advanced stability enhancement system. These systems operate with the assist of a brake system regulating pressure applied to brake calipers at each of the wheels.

The vehicle powertrain system, which may comprise the engine, transmission, prop shaft, axles, and wheels is, in effect, a system of rotary masses and torsional springs that has an oscillatory behavior. Surface (road) friction provides the counteracting torque to the powertrain-applied torque, and therefore acts as a damping force that stabilizes the system.

Wheel slip is induced under heavy acceleration or braking. At some level of wheel slip, the surface friction (i.e., grip of the road surface on the tire) is no longer able to match the applied torque (i.e., torque being applied to the tire via the wheel). This results in a reduced damping force in the system, and oscillations in the wheel develop at the natural frequency of the wheels or powertrain (typically 5 to 10 Hz). This wheel oscillation can induce vibrations that are uncomfortable to occupants of the vehicle. The vibrations, if severe enough, may also cause damage to one or more portions of the vehicle including its axle, wheels, body, etc.

Current available solutions may include filtering the ABS or TCS controlled pressure signals, adding a "dead zone" in the controls, or adding a dead zone in the sensor-measured wheel speed/acceleration signals when the wheel oscillation is detected. This will not mitigate the actual wheel oscillation, but such a system would attempt to avoid amplifying the oscillation by regular ABS/TCS actions. Other current solutions may include the reduction of engine torque. Reduction of the engine torque, however, will lead to sacrificing vehicle acceleration.

It will also appreciate that the changing frequency that occurs with wheel oscillation can vary with characteristics of the vehicle's chassis, tires, weight distribution and/or road conditions. If the frequency matches the wheel natural frequency, this oscillation condition tends to increase and worsen in magnitude during hard acceleration of the vehicle.

SUMMARY

In one aspect the present disclosure relates to a method for mitigating wheel hop of a motor vehicle. The method may comprise detecting an oscillation of a wheel speed of a driven wheel of the motor vehicle during an acceleration of the motor vehicle. When oscillation of the wheel is detected, a low amplitude, high frequency ripple braking signal may be generated and applied to a brake caliper associated with the wheel to modulate a braking action acting on the wheel.

In another aspect the present disclosure relates to a method for mitigating wheel hop of a motor vehicle by using a wheel speed sensor to monitor a wheel speed of a driven wheel of the vehicle, and to generate a wheel speed output signal. The method also may use a frequency measuring subsystem to measure a frequency of the wheel speed output signal. A controller may be used to determine if the frequency of the wheel speed output signal indicates that a wheel hop condition is present. When the controller determines that a wheel hop condition is present, a braking subsystem of the vehicle is caused to generate a ripple braking signal to a brake caliper associated with the wheel oscillation to mitigate the wheel hop condition.

In still another aspect the present disclosure relates to a system for mitigating wheel hop of a motor vehicle. The system may comprise a wheel speed sensor configured to monitor a wheel speed of a driven wheel of the vehicle and to generate a wheel speed output signal. A frequency measuring subsystem may be included which is configured to measure a frequency of the wheel speed output signal. A controller may be included which is configured to use the frequency of the wheel speed output signal to determine if the wheel speed output signal indicates that a wheel hop condition is present. A brake system may be included which has a brake caliper operably associated with the wheel, and which is responsive to signals from the controller when the controller determines that a wheel hop condition is present. The brake system may cause a ripple braking signal to be applied by the brake caliper to the wheel to mitigate the wheel hop condition.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
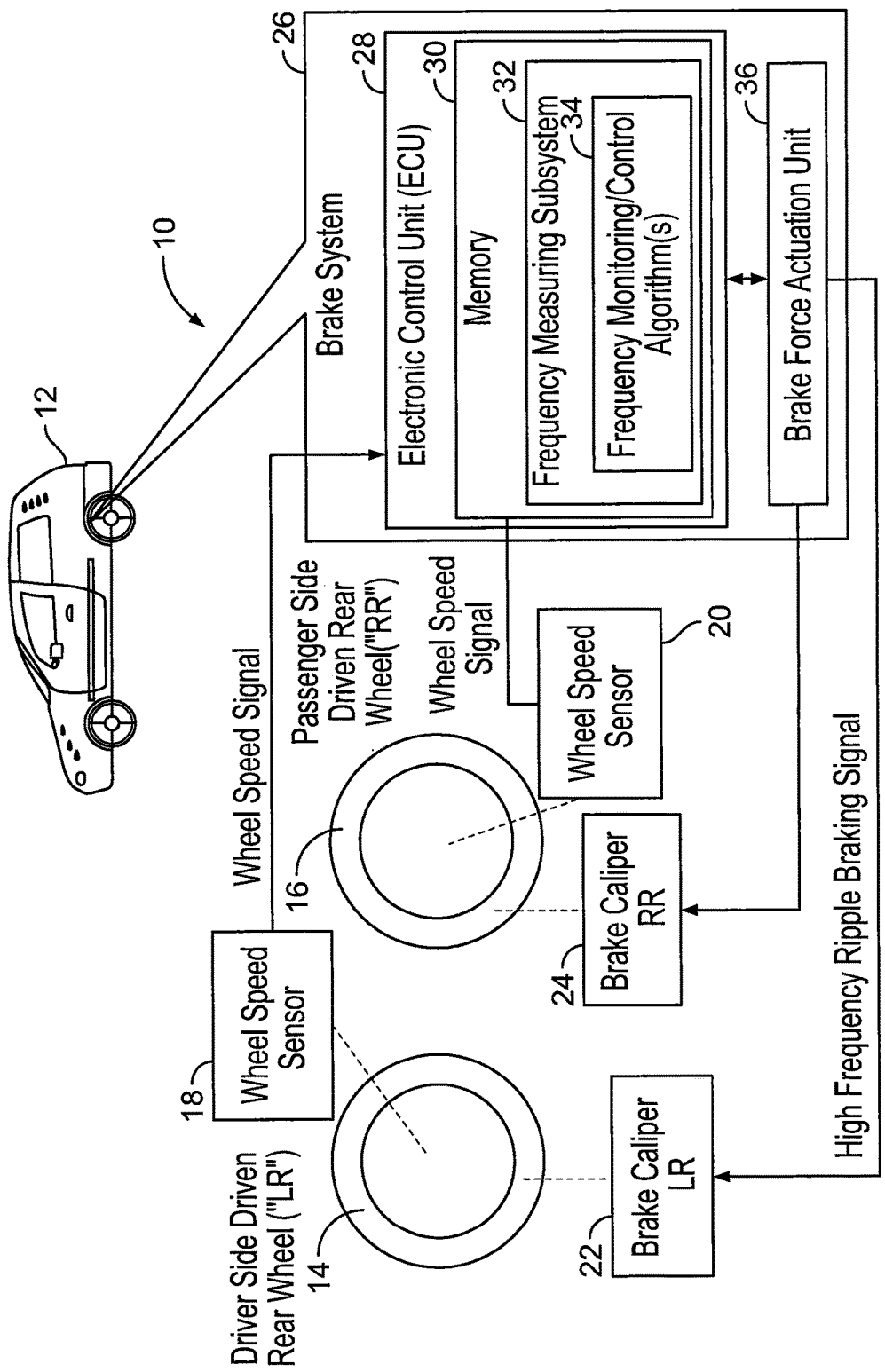
FIG. 1 is a block diagram of a system in accordance with one embodiment of the present disclosure.

The following description is merely exemplary in nature and is not intended to limit the present disclosure, application, or uses. It should be understood that throughout the drawings, corresponding reference numerals indicate like or corresponding parts and features.

Referring to FIG. 1, one embodiment of a system 10 for detecting and mitigating wheel hop in a motor vehicle 12 is shown. The system 10 in the example of FIG. 1 may be implemented on a two wheel drive vehicle (either front wheel drive or rear wheel drive), on an all-wheel drive ("AWD") vehicle, or on a vehicle with a user selectable 4-wheel drive system. For convenience, the system 10 is shown in FIG. 1 being implemented on a two wheel drive vehicle having driven wheels 14 (left/rear or "LR") and 16 (right/rear or "RR"). LR Wheel 14 has a wheel speed sensor 18 and a brake caliper 20, and RR wheel 16 similarly has a wheel speed sensor 22 and a brake caliper 24.

A brake system 26 of the vehicle 12 may include an electronic control unit ("ECU") 28, a memory 30 (e.g., RAM and/or ROM), and a frequency measuring subsystem 32 having one or more frequency monitoring/control algorithms 34 stored in the memory 30. It will be appreciated that the memory may also be a standalone component that communicates with the ECU 28 via a suitable bus. The ECU 28 sends electronic signals to a brake force actuation unit 36 to control the braking force applied by each brake caliper 22 and 24.

As will be explained in greater detail in connection with FIG. 2, the ECU 28 monitors the outputs of the wheel speed sensors 18 and 20 to determine if a wheel hop condition may be detected. The ECU 28 accomplishes wheel hop detection by analyzing information provided by the frequency measuring subsystem 32 and by determining when the output from either of the wheel speed sensors 18 or 20 forms a sinusoidal pattern. If a sinusoidal signal pattern is present, then the ECU 28 determines if the frequency of the sinusoidal signal is within a predetermined frequency range. The predetermined frequency range is a range that has been empirically determined to indicate that wheel hop is occurring at the wheel associated with the monitored wheel speed sensor 18 or 20. If wheel hop is detected, the ECU 28 applies a high frequency, low amplitude braking ripple signal to the brake caliper 22 or 24 associated with the wheel 14 or 16 being monitored. The low amplitude braking ripple signal may be a sinusoidal signal having a frequency significantly higher than the natural frequency associated with a wheel hop condition. In one implementation the frequency of the low amplitude ripple braking signal may be in the range of between about 50 Hz-200 Hz, and more particularly between about 50 Hz-100 Hz. It will be appreciated that this frequency may vary considerably within the scope of the present teachings from the ranges above to tune the response of the system 10 for optimal performance. The amplitude of the braking ripple signal may also vary widely, but in at least some passenger vehicle applications with a hydraulic brake system, a braking signal on the order of about 2-10 bar is expected to suffice.

It will be appreciated that various vehicle and brake related factors may affect the specific frequency of the braking ripple signal or the optimum amplitude that is used. For example, the suspension of the vehicle 12, the wheelbase of the vehicle, the size of the wheels, the type of tires or rubber compound of the tires (e.g., touring versus high performance), and/or the brake system's pressure modulation speed, just to name a few variables, may need to be taken into account in tuning the system 10.

If the vehicle 12 includes a traction control system ("TCS") and/or an antilock braking system ("ABS"), it is also possible that the low amplitude braking ripple signal may be superimposed on a braking signal being generated by either the TCS or ABS systems. It is also possible that the wheel speed signal may be supplied to the ECU 28 via an output from the TCS and/or the ABS, or this algorithm can be implemented in the TCS or ABS systems.

The braking ripple signal from the brake force actuation unit 36 effectively modulates the brake caliper(s) 22 and/or 24 to suppress or mitigate the wheel hop condition with only a minimal negative influence, or no negative influence, on the overall acceleration of the vehicle 12. Importantly, the violent shudder that the vehicle operator would experience with an unmitigated wheel hop condition is substantially reduced or eliminated entirely.

Figure 2:
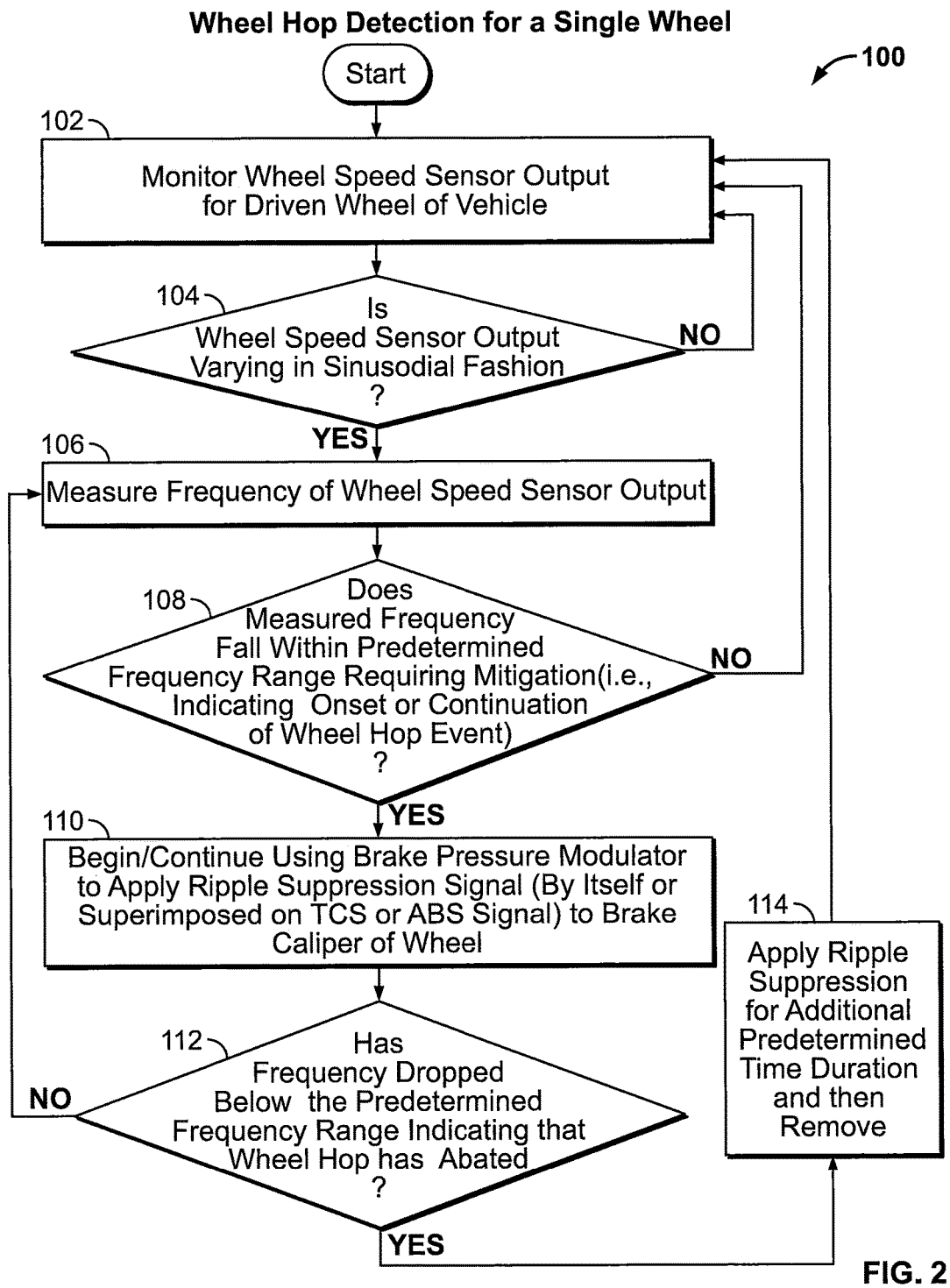
FIG. 2 is a high level flowchart illustrating various operations that maybe performed by the system of FIG. 1 in eliminating or mitigating wheel hop.

Referring to FIG. 2, a flowchart 100 is shown illustrating one example of various operations that may be performed to detect and address a wheel hop event during vehicle acceleration. At operation 102, the ECU 28 monitors the outputs of the wheel speed sensors 18 and 20 for each one of the driven wheels of the vehicle 12. For the purpose of this example, only one driven wheel will be addressed, although it will be understood that the operations described in connection with FIG. 2 are preferably performed substantially simultaneously on each driven wheel. The vehicle 12 may have two driven wheels or four driven wheels. The system 10 is equally applicable to all-wheel drive vehicles, and the operations described in connection with the flowchart of FIG. 2 would be applied to each of the four wheels of an all-wheel drive vehicle.

At operation 104, the ECU 28, and more particularly the frequency measuring subsystem 32, uses information supplied from the wheel speed sensor 18 of the driven wheel, which is wheel 14 in this example, together with the frequency monitoring/control algorithms 34, to determine if the wheel speed signal is varying in a sinusoidal fashion. If not, then operation 102 is repeated. Typically operation 104 may be repeated every 2 ms-10 ms by the ECU 28.

When the wheel speed sensor 18 output is detected as being a sinusoidally varying output at operation 104, then the ECU 28 uses the frequency measuring subsystem 32 to measure the frequency of the wheel speed sensor output signal, as indicated at operation 106. The ECU 28 then determines if the measured frequency falls within a predetermined frequency range requiring mitigation, as indicated at operation 108. By "requiring mitigation" it is meant that the frequency of the sinusoidally varying signal has a frequency that indicates that the onset of a wheel hop condition has occurred.

If the check at operation 108 indicates that the measured frequency of the output signal of the wheel speed sensor 18 is not within the predetermined frequency range, then operations 102 and 104 are repeated. However, if the check at operation 108 indicates that the measured wheel speed output signal does have a frequency within the predetermined frequency range indicating the onset of a wheel hop condition, then at operation 110 the controller 30 commands the brake force actuation unit 36 to begin applying a brake ripple suppression signal to the brake caliper 22 of the wheel 14. Thereafter, a check is made at operation 112 if the frequency of the sinusoidal signal has dropped below the predetermined frequency range. Such a drop indicates that the wheel hop condition has been successfully mitigated or suppressed. Thus, if the answer to the check at operation 112 is "No", then operations 106 and 108 are repeated. If the answer to the check at operation 112 is "Yes", then at operation 114 the ECU 28 continues to command the brake force actuation unit 36 to apply the brake ripple suppression signal for an additional predetermined time period. After operation 114, operations 102-108 may be repeated.

While the system 10 has been described in connection with an automobile based application, where the brake pressure actuation unit 36 would be applying a hydraulic ripple signal to the brake calipers 22 and 24, it will be appreciated that the system 10 is equally well suited to electromechanical brake force devices that apply a strictly mechanical signal to control the braking action. Accordingly, the system 10 is not limited in its application to any one specific (e.g., hydraulic or mechanical) type of braking system.

The system 10 and method of the present disclosure forms an effective means for detecting and mitigating wheel hop without requiring modifications to the vehicle chassis or additional suspension components, or modifications to the vehicle's transmission or differential, each of which could add weight, cost and complexity to the vehicle's construction. The system 10 and method of the present disclosure furthermore does not require any intervention by the user; wheel hop is detected and mitigated in a manner that appears seamless to the vehicle operator.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for mitigating wheel hop of a motor vehicle, the method comprising:
    using a wheel speed sensor to monitor a wheel speed of a driven wheel of the vehicle and generate a wheel speed output signal;
    using a frequency measuring subsystem to measure a frequency of the wheel speed output signal;
    using a controller to determine if the frequency of the wheel speed output signal indicates that a wheel hop condition is present; and
    when the controller determines that a wheel hop condition is present, causing a braking subsystem of the vehicle to generate a ripple braking signal to a brake caliper associated with the wheel oscillation to mitigate the wheel hop condition.

2. The method of claim 1, wherein the using of a frequency measuring subsystem to measure a frequency of the wheel speed output signal further comprises using the controller to determine if the frequency of the wheel speed output signal falls within a predetermined frequency range indicative of a wheel hop condition.

3. The method of claim 2, further comprising applying the ripple braking signal for a time duration after the wheel hop condition is detected as having abated.

4. The method of claim 3, wherein applying the ripple braking signal comprises applying a ripple braking signal having a frequency higher than a natural frequency of oscillation of the wheel speed occurring during the wheel hop condition.

5. The method of claim 2, wherein an initial determination is made if the frequency of the wheel speed output signal falls outside of a predetermined frequency range, indicating no wheel hop condition is present.

6. The method of claim 2, wherein the controller determines that the frequency of the wheel speed output signal indicates a wheel hop condition is present by determining that the frequency falls within a predetermined frequency range.

7. A system for mitigating wheel hop of a motor vehicle, the system comprising:
    a wheel speed sensor configured to monitor a wheel speed of a driven wheel of the vehicle and to generate a wheel speed output signal;
    a frequency measuring subsystem configured to measure a frequency of the wheel speed output signal;
    a controller configured to use the frequency of the wheel speed output signal to determine if the wheel speed output signal indicates that a wheel hop condition is present; and
    a brake system having a brake caliper operably associated with the wheel, and responsive to signals from the controller when the controller determines that a wheel hop condition is present, and causing a ripple braking signal to be applied by the brake caliper to the wheel to mitigate the wheel hop condition.

8. The system of claim 7, wherein the controller is further configured to determine if the frequency of the wheel speed output signal is within a predetermined frequency range, and wherein the predetermined frequency range indicates that a wheel hop condition is present.

9. The system of claim 7, where the ripple braking signal comprises a low amplitude ripple braking signal.

10. The system of claim 7, wherein the ripple braking signal is superimposed on a signal being applied to the brake caliper from a traction control system of the vehicle.

11. A method for mitigating wheel hop of a motor vehicle, wherein the method makes use of a wheel speed sensor of the vehicle to monitor a wheel speed of a driven wheel of the vehicle and to generate a wheel speed output signal, and a frequency measuring subsystem to measure a frequency of the wheel speed output signal to determine if a wheel hop condition is present, the method comprising:
    using an electronic control unit to determine, from the measured frequency, that a wheel hop condition is present;
    causing the electronic control unit to generate a signal to a brake force actuation unit; and
    using the signal to cause the brake force actuation unit to apply a ripple braking signal having a predetermined magnitude to at least one brake caliper of the vehicle, with the ripple braking signal having a frequency that is greater than a natural frequency of the wheel.

* * * * *